United States Patent [19]

Frost et al.

[11] 3,961,406
[45] June 8, 1976

[54] METHOD OF PULLEY CONSTRUCTION

[75] Inventors: Charles C. Frost, Grand Rapids; Douglas J. Van Der Meulen, Shelbyville; Siegfried K. Weis, Grand Rapids, all of Mich.

[73] Assignee: C. L. Frost & Son, Inc., Grand Rapids, Mich.

[22] Filed: Apr. 30, 1975

[21] Appl. No.: 573,037

Related U.S. Application Data

[62] Division of Ser. No. 346,329, March 30, 1973, Pat. No. 3,898,888.

[52] U.S. Cl. ............................................. 29/159 R
[51] Int. Cl.² ....................... B21K 1/28; B21K 1/42
[58] Field of Search ...................... 29/159 R, 159.3; 74/230.01, 230.8, 230.14, 230.11, 450, 449

[56] References Cited
UNITED STATES PATENTS

| 1,627,558 | 5/1927 | Grunwald | 74/230.8 |
| 2,610,514 | 9/1952 | Long, Jr. | 74/230.8 |
| 2,641,935 | 6/1953 | Wilken | 29/159 R X |
| 2,655,813 | 10/1953 | Howell | 29/159 R X |
| 2,981,120 | 4/1961 | Schultz, Jr. | 74/230.8 |
| 3,822,457 | 7/1974 | Frost et al. | 29/159 R |

FOREIGN PATENTS OR APPLICATIONS

| 536,704 | 5/1941 | United Kingdom | 74/230.14 |

*Primary Examiner*—Victor A. DiPalma
*Attorney, Agent, or Firm*—Price, Heneveld, Huizenga & Cooper

[57] ABSTRACT

Two identical shaped discs stamped in a die and joined together back-to-back to form a hub, web and belt-riding groove. The hub formed is an annular cup-shaped pocket in which a closely fitted bushing is received. The discs are formed from a blank in a compound progressive die in a single die station and are stamped with a locus of simultaneously coined surfaces to provide positive tolerance control of radial run-out and lateral run-out (wobble) when the discs are joined together.

19 Claims, 7 Drawing Figures

U.S. Patent June 8, 1976 3,961,406
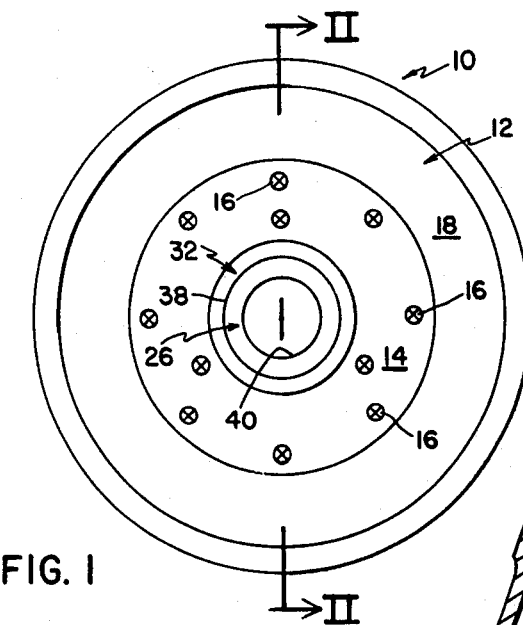
FIG. 1
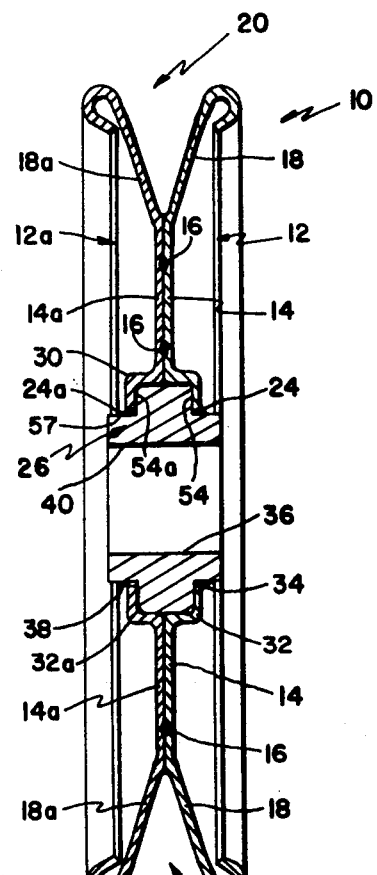
FIG. 2
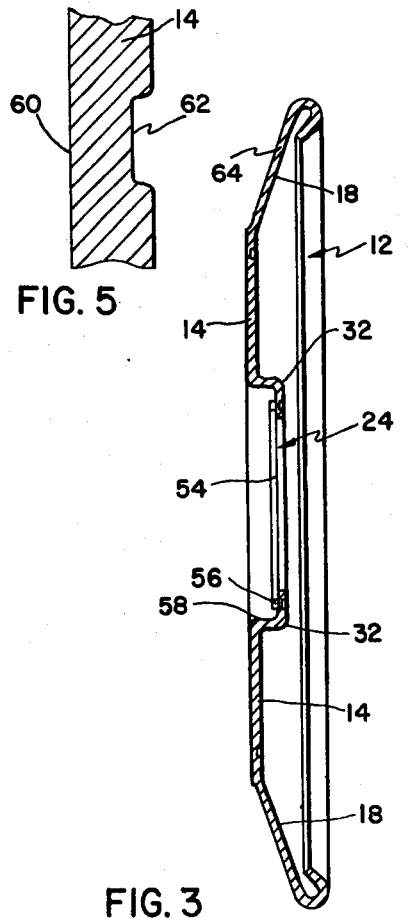
FIG. 5
FIG. 6
FIG. 3
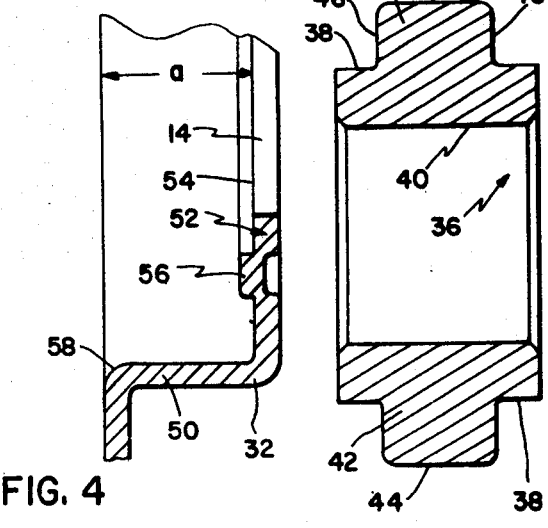
FIG. 4
FIG. 7

METHOD OF PULLEY CONSTRUCTION

This is a division of application Ser. No. 346,329, filed Mar. 30, 1973, now U.S. Pat. No. 3,898,888.

BACKGROUND OF THE INVENTION

This invention relates to an improved method and construction of pulley wheels.

The prior art is replete with methods and constructions of pulley wheels which utilize an annular hub member joined to a pair of back-to-back discs. Positive indexing of the hub member as well as positive control of the lateral run-out or wobble and radial run-out of the pulley wheel are constant objectives within economically feasible limits. Ancillary to this is the overall service-life of the wheel itself as well as total manufacturing costs. The pulley wheel industry is highly competitive and there is a constant need for an improved method and construction of a pulley wheel which has negligible run-out and wobble, and a longer service-life at reduced costs.

SUMMARY OF THE INVENTION

In accordance with the invention, a pulley wheel is comprised of an annular hub member captured between two identical discs joined together back-to-back. The hub member and discs include openings for receiving a mounting shaft and the discs include an inner lip having a generally axially and radially extending portion which forms a generally cup-shaped pocket for capturing and indexing the hub member.

In more narrower aspects, the discs include a radially extending web portion and oppositely extending flared portions which form a belt-receiving groove. The discs are joined together by welding the web portions together and welding at least one of the disc lip portions to the hub member. Preferably, the web portions are spot welded and the lip portion is mig welded to the hub, the latter being an arc weld utilizing a metal and inert gas. The combined length of the axially extending lip portions are less than the axial thickness of the hub member to assure a positive engagement between the radially extending lip portion and sides of the hub member to index the latter relative to the discs. Likewise, the disc may be formed using a compound progressive die which coins an annular surface on each lip portion, web, and flared portions thereby providing a positive control of radial and lateral run-out.

A principal advantage of the present invention is the elimination of the hub member itself as the critical machined element. That is, the stamping of each disc along with its related coined surfaces indexes the hub member relative to the discs and reduces the critical radial and lateral run-out (wobble) well below accepted levels of tolerance. Yet another advantage is the isolation of the mig weld from the web portion of each disc. The discs are cold worked during stamping and conventional brazed welding relieves this cold working. However, by mig welding the hub member to the lip portion which is removed from the web portions of the discs, the hub member acts as a heat sink thereby providing a pulley construction of increased service-life.

DESCRIPTION OF THE DRAWINGS

FIG. 1 is a side elevation view of a pulley wheel constructed in accordance with the invention;

FIG. 2 is a cross-sectional view of the pulley wheel shown in FIG. 1 taken along line II—II;

FIG. 3 is a cross-sectional view similar to FIG. 2 of one of the discs utilized in constructing the pulley of the invention;

FIGS. 4–6 are enlarged fragmentary cross-sectional views of the corresponding cup portion, web portion and outer portion of the disc; and FIG. 7 is an enlarged cross-sectional view of the hub bushing shown in FIGS. 1 and 2.

DESCRIPTION OF THE PREFERRED EMBODIMENT

Referring now to the drawings in detail, FIGS. 1 and 2 illustrate an assembled pulley wheel 10 constructed in accordance with the invention. A pair of identical discs 12 and 12a are joined together along their respective web portions 14 and 14a by spot welds 16. Spot welds 16 are shown in FIG. 1 merely to locate them. They will not be definitively apparent since the weld is internal. In addition to web portions 14, 14a, each disc includes an annular outer flared portion 18 and 18a which portions flare in the opposite direction when the discs are joined back-to-back forming an annular belt-receiving groove 20.

Each disc 12 and 12a includes a central opening 24 and 24a in which is positioned an annular hub member 26. The hub member 26 is captured in an annular generally cup-shaped pocket 30 formed by an inner lip 32 and 32a (FIG. 2) extending inwardly from web portions 14 and 14a. Hub member 26 is welded to one of the disc portions by a mig weld 34.

Hub member 26 includes a central bore 36 for receiving a mounting shaft (not shown). The hub member has a cylindrical shape with an outer wall 38 and an inner wall 40. In addition, hub member 26 includes an annular projection 42 extending radially beyond its outer wall surface 38. Projection 42 defines a circumferential shoulder surface 44 and a pair of radial shoulder surfaces 46 and 48, which are captured within pocket 30 to index hub member 26 within discs 12 and 12a. In accordance with the invention, hub member 26 is comprised of machined steel and while it is important that shoulders 44, 46 and 48 are square with each other and bore 36, the indexing of hub member 26 relative to discs 12 and 12a is controlled by the precise nature of discs 12 and 12a which will be described hereinafter. Thus, one advantage of the invention is that hub member 26 can be constructed in accordance with conventional manufacturing tolerances thereby eliminating the requirement of high cost high tolerance machining heretofore required.

Referring now to FIG. 3, one of the discs 12 utilized to form pulley wheel 10 is shown. Since discs 12 and 12a are identical, only one will be described in detail. Each disc is stamped and formed from sheet metal using a compound progressive die to form the lip 32 and the flared portion 18 in a single die station. This eliminates the necessity of a series of stamping operations thereby reducing the overall cost. Of equal importance however, three surface portions on each disc are coined simultaneously thereby assuring their critical dimensional relationships to each other.

Referring specifically to FIG. 4, lip 32 is comprised of an axially extending portion 50 and a radially extending portion 52. In accordance with the invention, the indexing of hub member 26 relative to pulley discs 12 and 12a is achieved in part by forming a positive tight engagement between the inner surface 54 of lip portion 52 with shoulder surfaces 48 (FIG. 7) of hub projection 42. Likewise, the corresponding lip surface on disc 12a is positively indexed against shoulder surface 46 of hub projection 42. This is achieved in two ways. First, the combined axial width of pocket 30 defined by the longitudinal distance between inner surfaces 54 and 54a (FIG. 2) of discs 12 and 12a is selected to be equal to or slightly less than the axial thickness of projection 42 when the two discs are spot welded together. In this fashion, there is a positive butting engagement between the hub projection and the inner surfaces of the cup pocket. Secondly, an annular portion 56 (FIG. 4) of radially extending portion 52 of lip 32 is coined to define an accurate abutment surface for engagement with shoulder surfaces 46 and 48 of hub member 26. The projection of coined portion 56 is exaggerated in FIG. 4 for illustration only. It is formed conventionally by indenting on the opposite surface at 53 which displaces the material into portion 56.

The inner surface 58 of the axially extending lip portion 50 will preferably abut with shoulder surface 44 of projection 42. In fact, the diameter of pocket 30 is slightly less than the diameter of projection 42 to permit insertion therein to provide a slight gap 57 in which mig weld 24 is placed. In either case, a close tight fit of the bushing in the pocket is provided. When hub member 26 is positioned within pocket 30, the hub member is indexed relative to the remaining portions of discs 12 and 12a thereby greatly decreasing the tolerance of lateral and radial run-out. In addition, the physical presence of radial lip portion 52 provides a physical barrier to lateral shifting of hub member 26. This also reduces any tendency for lateral run-out or wobble.

The precision movement of pulley wheel 10 is also achieved in part by simultaneously coining two other reference surfaces in addition to reference surface 56 coined on the radial portion 52 of lip 32. The second coined surface 60 is located at the transition from web 14 to flared portion 18 (FIGS. 3 and 5) in this instance, the coining operation causes an indentation 62 on the outer surface of web 14 but the corresponding normal displaced projection on the opposite surface is prevented in the stamping since the flat abutting engagement between the respective webs 14 and 14a of discs 12 and 12a is important. However, the dimensional relationship between surface portion 60 opposite indentation 62 is none the less dimensionally precise relative to coined surface 56.

The third coined surface is a very slight coining defined by indentation 64 performed on the inner surface of flared portions 18 and 18a of discs 12 and 12a. The indentation shown in FIG. 6 is greatly exaggerated with the coined surface being comparable to score lines. Although the coining is extremely slight in terms of the magnitude of indentation, this particular locus of flared portions 18 and 18a is important in that it is the particular location where the belt is received in the groove. By simultaneously coining a reference surface on both the web and flared portions of each disc, the radial dimension therebetween is accurately indexed. This provides a positive control of radial run-out. By simultaneously coining a reference on the lip portion of each disc along with the web and flared portions, the lateral dimensions of the disc are accurately indexed. This provides a positive control of lateral run-out or wobble. Finally, the provision of a physical barrier to lateral movement of hub member 26 as a result of the lip 32 increases the overall lateral rigidity.

One of the principal features of the invention is being able to provide three simultaneously coined surfaces in the formation of the die in which each disc is stamped. This eliminates the necessity of extremely expensive close tolerance machining of both the hub member and discs. In accordance with the invention, applicants have been able to maintain total side wobble of pulley 10 at or less than 0.01 total indicator reading (T.I.R.). In addition, the radial run-out at belt pitch diameter has been maintained at or less than 0.010 T.I.R. when the pulley is revolved on the bore center line.

In addition to significantly reducing the amount of lateral and radial run-out, the overall construction of the pulley is significantly more economical to both make and assemble. The manufacture of each pulley wheel is achieved by shaping the discs in a single die stamping operation and milling a hub member in accordance with conventional manufacturing tolerances. The assembly into a pulley wheel simply calls for positioning the hub member intermediate the two discs at which point the web portion is spot welded at a locus of points 16 as illustrated in FIG. 1. Three spot welds 16 (FIG. 1) are placed along an inner radius at equal angular locations and eight spot welds are placed along an outer radius at equal angular locations. This provides positive welding at a location near both the inner and outer transition areas of the web. Finally, the hub member is mig welded to at least one of the lip portions of discs 14 or 14a.

The pulley construction in accordance with the invention eliminates the necessity of braze welding since the webs of the discs are spot welded together and the hub member may be mig welded to the lip portion of the discs. The utilization of a mig weld is of additional significance in accordance with the unique configuration of the lip portions of each disc in that the mig welding is conducted at a point removed both axially and radially from the web portions of each disc. During the formation process of each disc by stamping, a certain amount of cold working of the discs results which provides added strength to the discs. The heat caused by conventional braze welding relieves much of the cold working of the discs thereby weakening them. By mig welding the hub member to the disc at a point removed from the webs, most of the heat is absorbed by the hub member which acts as a heat sink. This eliminates or greatly reduces the chance of relieving the cold worked discs. The result is a pulley construction having a significantly greater service-life since it will not fail nearly as soon through fatique as a pulley construction wherein the cold work is relieved. Thus, an extremely simple, more economical pulley is provided by the invention which at the same time reduces internal and radial run-out with added service-life.

Although but one embodiment has been shown and described in detail, it will be obvious to those having ordinary skill in this art that the details of construction of this particular embodiment may be modified in a great many ways without departing from the unique concepts presented. It is therefore intended that the invention is limited only by the scope of the appended claims rather than by particular details of construction shown, except as specifically stated in the claims.

The embodiments of the invention in which an exclusive property or privilege is claimed are defined as follows:

1. The method of high speed precision pulley wheel construction comprising, the steps of:
   a. providing a pair of identical flat metallic discs having identical means defining a central opening;
   b. stamping said discs in a die such that each of said discs have an outwardly extending annular outer portion, a flat radially extending web portion, and an inner flange portion formed with a first portion extending axially away from said web portion and a second portion extending radially inward from said first portion;
   c. forming a coined surface of reference on the inner surface of said second flange portion whereby said inner surface is offset outwardly from said coined surface;
   d. providing an annular hub member with means for receiving a shaft, said hub member including an annular projection having relatively flat radial and axial sides;
   e. joining said pair of identical discs back-to-back with said hub member captured between said flange portions, said flange portions forming a pocket for said hub member such that the inner surface of said first portion of said flange portions is in positive press face-to-face contact with the axial sides of said hub projection and the inner surface of said second portion of said flange portion is in positive press face-to-face contact with the radial side of said hub projection with said coined surface indexing said discs relative said hub member to prevent lateral and radial movement relative said discs; and
   f. joining said discs together to form said pulley wheel.

2. The method according to claim 1 wherein said coined surface is annular and uninterrupted.

3. The method of pulley construction according to claim 1 wherein said discs are joined together by spot welding the web portions of said discs together and said hub member is welded to one of said disc flanges.

4. The method of pulley construction according to claim 3 wherein said web portions are spot welded together at circumferentially spaced positions to define a locus of welds along an inner and outer radius along the transition of said web portion with said flanges and annular outer portion.

5. The method of pulley construction according to claim 1 wherein each of said discs is formed with a coined surface of reference in addition to said one surface along the inner surface of said annular outer portion and web portion, said locus of coined surfaces of reference being formed simultaneously to positively index each of said disc portions relative to each other.

6. The method of pulley construction according to claim 5 wherein the annular outer portion, web portion and inner flange means of each of said discs is formed with a coined surface to reference formed simultaneously when each disc is stamped to index each of said portions relative to each other.

7. The method of pulley construction according to claim 6 wherein said coined surfaces of reference are formed simultaneously in a compound progressive die.

8. The method of pulley wheel construction comprising the steps of: providing an annular hub member having means for receiving a shaft; forming a pair of identical discs by stamping in a die, said discs having a central opening, web portion and annular outer portion; forming an inner flange about said disc opening, said flange being formed with a first portion extending axially away from said web portion and a second portion extending radially inward from said first portion; said annular outer portions and flanges extending in opposite directions when said discs are joined back-to-back whereby said inner flanges form an annular, generally C-shaped cup-shaped pocket for receiving, holding and indexing said hub member therein to prevent lateral and radial movement relative to said discs when said discs are joined together; forming a surface of reference on each of said inner flanges, said surface of reference being distinct from the remaining surface of said inner flanges; and joining said two discs together with said hub member positioned in said central opening, said hub member being of a dimension to provide positive press engagement of the inner surfaces of said first and second flange portions when said discs are joined together, said surface of reference abutting said hub member to provide a positive and accurate relationship between said hub member and said discs.

9. The method of pulley wheel construction according to claim 8 wherein said surface of reference on said inner flange is offset with respect to the remaining surface.

10. The method of pulley wheel construction according to claim 9 wherein said surface is annular.

11. The method of pulley wheel construction according to claim 8 wherein a second surface of reference is formed on said web portion distinct from the remaining surface thereof, said second surfaces of reference abutting each other when said discs are joined back-to-back positioning said discs in a positive and accurate position relative each other.

12. The method of pulley wheel construction according to claim 11 wherein said surfaces of reference on said flange means and web portion are parallel to each other.

13. The method of pulley wheel construction according to claim 12 wherein said first and second surfaces on each disc are annular and concentric with respect to each other.

14. The method of pulley wheel construction according to claim 13 wherein said annular surface of reference on said inner flange is formed offset with respect to the remaining surface thereof.

15. The method of pulley wheel construction according to claim 8 wherein each of said inner flanges includes a first portion extending axially away from said web portion and a second portion extending radially inwardly from said first portion, said outer portions and flange means extending in opposite directions when said discs are joined back-to-back whereby said outer portions form an outwardly opening belt-receiving groove and said flange means form an annular cup-shaped pocket for receiving, holding and indexing said hub member therein to prevent lateral and radial movement relative to said discs when said discs are joined together.

16. The method of pulley wheel construction according to claim 15 wherein said second portion of said flanges includes said surface of reference of said flanges along its inner surface and abuts said hub member to index said hub member relative to said discs.

17. The method of pulley wheel construction according to claim 16 wherein said surface of reference on said second portion of said flanges is offset with respect to the remaining surface thereof.

18. The method of pulley wheel construction according to claim 17 wherein a second surface of reference is formed on said web portion distinct from the remaining surface thereof, said second surfaces of reference abutting each other when said discs are joined back-to-back positioning said discs in a positive and accurate position relative each other.

19. The method of pulley wheel construction according to claim 15 wherein said hub member is formed with a portion having an axial width and diameter corresponding to said cup-shaped pocket, said portion defining an axial and radial periphery, such that the axial periphery of said hub portion is in positive abutment with the first portion of said inner flange, of each disc and the radial periphery of said hub portion is in positive abutment with said second flange portion of said discs.

* * * * *